(12) United States Patent
Larsen et al.

(10) Patent No.: US 8,436,946 B2
(45) Date of Patent: May 7, 2013

(54) METHOD AND SYSTEM FOR SCANNING TELEVISION SYSTEMS USING A FIRST QUICK SCAN AND A SECOND SLOWER SCAN

(75) Inventors: Tonni Sandager Larsen, Escondido, CA (US); Yuko Suzuki, Tokyo (JP); Norifumi Takaya, San Diego, CA (US); William Schupp, San Diego, CA (US); Max Wu, San Diego, CA (US); Liviu Burciu, Loma Linda, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 617 days.

(21) Appl. No.: 12/352,522

(22) Filed: Jan. 12, 2009

(65) Prior Publication Data
US 2010/0177252 A1   Jul. 15, 2010

(51) Int. Cl.
*H04N 5/50* (2006.01)
(52) U.S. Cl.
USPC .......................................... 348/732; 348/731
(58) Field of Classification Search .......... 348/731–733, 348/734, 725, 554–558; 455/180.1, 188.1, 455/185.1, 186.1, 186.2, 166.1, 168.1
See application file for complete search history.

(56) References Cited

U.S. PATENT DOCUMENTS

| | | | |
|---|---|---|---|
| 2007/0274405 A1 | 11/2007 | Adachi | |
| 2008/0107394 A1 | 5/2008 | Lee | |

FOREIGN PATENT DOCUMENTS

| | | |
|---|---|---|
| EP | 0601554 | 6/1994 |
| EP | 0601554 A1 * | 6/1994 |
| KR | 1019990039361 | 6/1999 |
| KR | 1020070078187 | 7/2007 |
| KR | 1020070102323 | 10/2007 |
| WO | 2005-117426 | 12/2005 |

* cited by examiner

*Primary Examiner* — Michael Lee
(74) *Attorney, Agent, or Firm* — John L. Rogitz

(57) ABSTRACT

A method of scanning television channels at initial setup. The method includes at a first power mode, automatically scanning for channels using a first scanning setup procedure during which the television is unusable by a user. The first power mode is when the television is at a full power mode. The detected channels are automatically provided for use by the television upon completion of the first scanning setup procedure. The method further includes automatically scanning for channels using a second scanning setup procedure at a second power mode following the first power mode. The second power mode is at a lower power mode than the first power mode, and the second scanning setup procedure is more time consuming in comparison to the first scanning setup procedure. Additional channels not detected during the initial setup by the first scanning setup procedure are automatically detected at the second power mode.

7 Claims, 3 Drawing Sheets

METHOD AND SYSTEM FOR SCANNING TELEVISION SYSTEMS USING A FIRST QUICK SCAN AND A SECOND SLOWER SCAN

TECHNICAL FIELD

Embodiments of the present invention relate to the field of electronics. More particularly, embodiments of the present invention relate to automatic scanning of television channels.

BACKGROUND ART

In general, television sets are setup before being used for the first time. For example, a television set must scan available channels before it can be used to display broadcast channels. Some channels may be harder to scan and to detect. Many cable and selectable providers have long channel selections. As a result, scanning for channels may take a long time, e.g., 50 minutes. Unfortunately, the television set cannot be used to display broadcast channels during the scanning period. Therefore, the longer it takes to scan for channels the longer the television set remains unavailable to the user, thereby inconveniencing and potentially frustrating the new television set owner.

In general, channels cannot be added after the television set completes scanning for channels unless a new scan is performed. As described above, scanning for channels may take a long time, thereby inconveniencing the user by making the television set unavailable during scanning. Therefore, many users may new channels may go undetected.

One conventional method to reduce the time required for channel scanning is to use a fast scanning method. Unfortunately, the fast scanning method is not a comprehensive scan of all the channels, thereby omitting many of the channels that are harder to scan. As a result of using fast scan only a fraction of the broadcast channels are detected and become available to the user for viewing while other broadcast channels remain unavailable to the user.

SUMMARY

Accordingly, a need has arisen to enable faster channel scan to provide detected channels to the user in a timely fashion while providing an overall scan process that is comprehensive regarding channel detection. Furthermore, a need has arisen to provide a comprehensive channel scan when the television is not used by the user, e.g., when in a low power mode, standby, etc., to detect channels that were missed during the faster channel scan. Moreover, a need has arisen to automatically and periodically provide a comprehensive channel scan to detect newly added channels. It will become apparent to those skilled in the art in view of the detailed description of the present invention that the embodiments of the present invention remedy the above mentioned needs and provide the above referenced advantages.

According to one embodiment of the present invention, a first scanning setup procedure and a second scanning procedure are provided. The first scanning setup procedure is faster than the second scanning setup procedure. The threshold timeout for the first scanning setup procedure may be decreased during channel scan, thereby executing faster in comparison to the second scanning setup procedure. Moreover, the first scanning setup procedure may use the modulation and the carrier standard of the first found channel to detect the remainder of the broadcast channels. Therefore, the first scanning setup procedure executes faster in comparison to the second scanning setup procedure. It is appreciated that while the second scanning setup procedure requires a longer time to execute in comparison to the first scanning setup procedure, the second scanning setup procedure provides a more comprehensive channel scan and may take place while the television set is in standby mode.

More specifically, the first scanning setup procedure may be automatically launched at the initial setup procedure, e.g., the first time the television set is being setup. During the first scanning setup procedure, the television set becomes unavailable to the user. Upon rapid completion of the first scanning setup procedure, the detected channels become available to the user. The lengthy second scanning setup procedure may be automatically launched when the television set is placed in a lower power mode, e.g., standby mode, any mode of collecting interactive program guide, power off mode, etc. In other words, the more comprehensive channel scan is performed in the background and when the television set is not used by the user.

According to one embodiment, additional channels may be detected during the second scanning setup procedure executed periodically. The additional detected channels may be channels that were missed during the first scanning setup procedure. The user may be prompted that newly detected channels are ready for viewing when the television set is placed back to its full operating mode, e.g., on mode.

Accordingly, the rapid first scanning setup procedure provides access to a limited number of detected channels in a timely fashion. The lengthy second scanning setup procedure on the other hand detects channels that were missed during the first scanning setup procedure. The second scanning setup procedure executes when the television set is not being used. Thus, a limited number of channels are provided in a timely fashion while a comprehensive list of channels are provided upon completion of the second scanning setup procedure.

It is appreciated that the second scanning setup procedure may be automatically launched at a user defined intervals to detect newly added channels that are part of the broadcast channels. Similarly, the user may be prompted and notified that new channels are detected.

More particularly a method of scanning television channels at initial setup is provided. The method includes automatically scanning for channels using a first scanning setup procedure at a first power mode, e.g., full power mode. During the first scanning setup procedure the television is unusable by a user. Upon completion of the first scanning setup procedure, the detected channels are automatically provided for use by the television. The method further includes automatically scanning for channels using a second scanning setup procedure at a second power mode following the first power mode. It is appreciated that the second power mode is at a lower power mode than the first power mode, and wherein the second scanning setup procedure is more time consuming in comparison to the first scanning setup procedure.

It is appreciated that the second scanning setup procedure may have a longer time out parameter for finding a channel in comparison to the first scanning setup procedure. The first scanning setup procedure may use only the carrier and the modulation used to find a first detected channel to detect the remaining channels while the second procedure is not so limited. Thus, the second scanning setup procedure is more comprehensive in comparison to the first scanning setup procedure.

The embodiments include the above and wherein the method further includes while the television set is in the second power mode, automatically detecting additional channels not detected during the initial setup by the first scanning setup procedure. The method may further include, in response to detecting the additional channels, automatically providing the additional channels for use by the television when the television is at the first power mode. It is appreciated that the user may be automatically prompted that the additional channels are detected, wherein the prompting occurs at the first power mode.

According to one embodiment, the method may further include subsequent to automatically scanning for channels using the second scanning setup procedure, automatically and periodically scanning for channels using the second scanning setup procedure at standby power mode

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
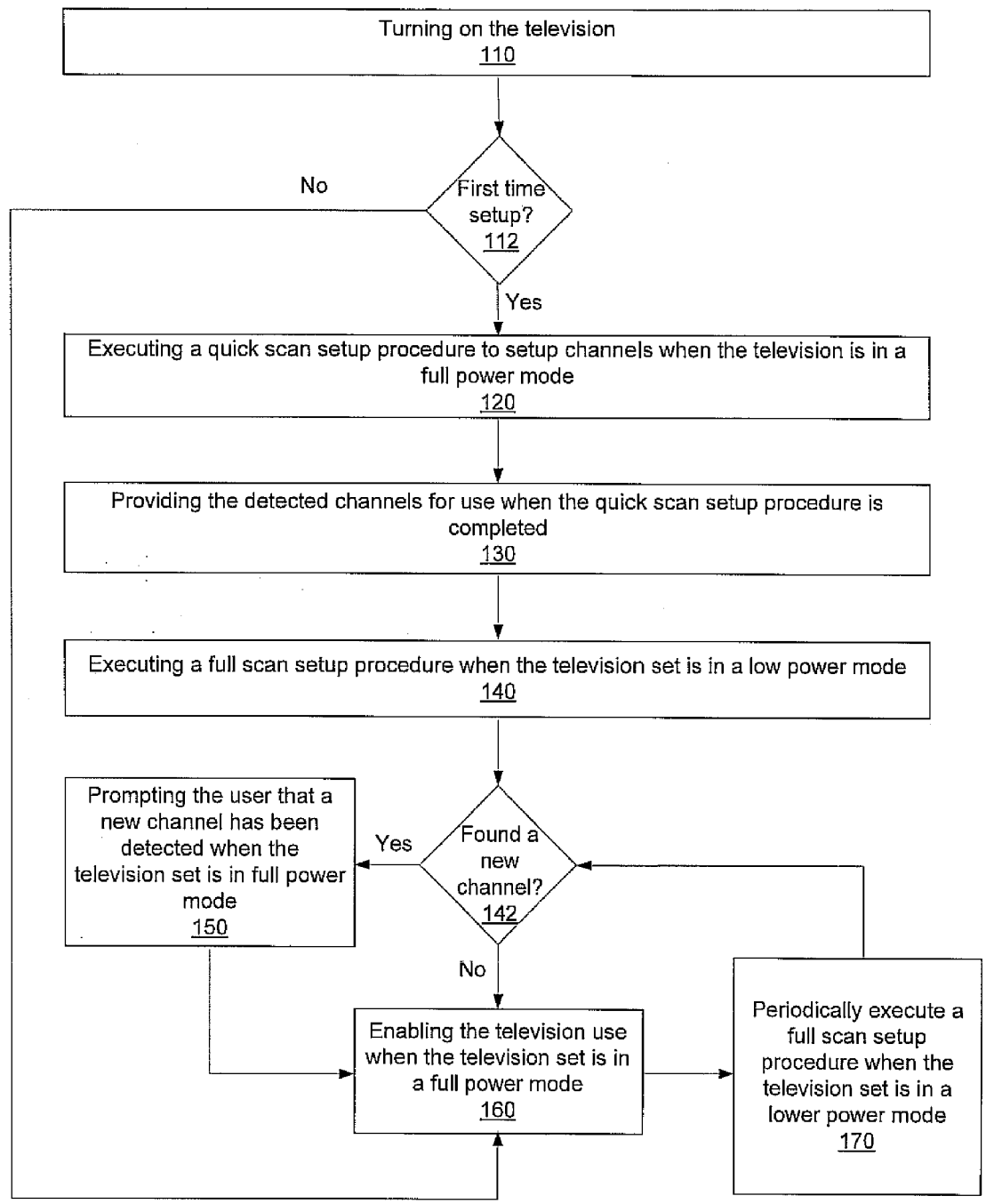
FIG. 1 shows a flow diagram of an exemplary method of scanning channels in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

NOTATION AND NOMENCLATURE

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, television set executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or "receiving" or "sending" or "providing" or "storing" or "displaying" or "rendering" or "scanning" or "detecting" or "prompting" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System for Scanning Television Channels

Referring now to FIG. 1, an exemplary computer implemented method 100 of a television set automatically scanning channels in accordance with one embodiment of the present invention is shown. At step 110, a user may power on the television set. A setup of a television set may be required before the television set can be used for the first time. For example, the television set is required to scan for broadcast channels before allowing the user to watch the detected channels. Accordingly, at step 112, it is determined whether the television set has completed a first time setup such as an initial setup for channel scanning.

If it is determined that the first setup, e.g., channel scanning, has been completed, then at step 160 the detected channels are automatically provided for use by the user. It is appreciated that the user may interact with the detected channels when the television set is in a full power mode.

On the other hand, if the first time setup, e.g., channel scanning, has not been completed then no channels have been detected so at step 120, a quick scan to setup channels is automatically executed in accordance with an embodiment of the present invention. It is appreciated that the quick scan is executed when the television set is in a full power mode. The quick scan may be a cursory scan to detect channels rapidly. For example, the quick scan may only take a few minutes to complete, e.g., 5 minutes.

At step 130, the detected channels are stored in memory and may be automatically provided to the user after the completion of the quick scan execution. It is appreciated that the detected channels may be provided for use when the television set is in a full power mode, e.g., on. Accordingly, the user may use the detected channels resulting from the completion of the quick scan in a short and convenient period of time.

At step 140, a lengthy and comprehensive full scan is automatically executed when the television set is placed in a lower power mode. For example, when the user finishes watching television, the television set may be placed in a lower power mode, e.g., a standby mode, etc. In other words, the full scan is executed when the television set is in a power mode other than its full operating mode. Accordingly, the full scan is executed in the background when the television set is not being used. Thus, in the lower power modes, it is of no consequence how long it may take to execute and complete the full scan because the television set is not being used by the user. In the full scan, detected channels are added to the memory.

It is appreciated that the full scan is a more comprehensive scan in comparison to the quick scan. In general, scanning scans through various modulation standards, carrier standards and different frequencies in order to detect a channel. Scanning may have a timeout associated with at least one of the carrier standards, modulation standards and/or frequencies. As a result, the scanning times out and changes at least one of: carrier standard, modulation and/or frequency when a channel is not detected during the allotted time.

Some carrier standards, modulations and frequencies are more difficult to detect, thereby requiring a longer threshold time to be detected. In order to reduce the scanning time, the timeout associated with at least one of the carrier standards, the modulation standards and/or frequencies may be decreased during the quick scan. Reducing the timeout associated with at least one of carrier standards, modulation standards and/or frequencies in the quick scan may lead to a failure to detect a channel during scanning even though that channel is being broadcast. However, reducing the timeout in the quick scan enables those detected channels to become available to the user in a shorter period of time in comparison to the full scan.

The comprehensive full scan may be executed in order to detect channels that were missed during the quick scan. This scan may take 40 minutes or longer to complete in a typical instance. The full scan may execute in the background when the television set is at a lower power mode. As a result, newly detected channels that were missed by the quick scan become available to the user after the execution of the full scan is completed and when the television set is placed in a higher power mode, e.g., turned on. Thus, not only does the user have access to channels detected during quick scan in a short period of time resulting but a comprehensive list of channels becomes available at the completion of the full scan execution.

At step 142, it is automatically determined whether a new channel resulting from a full scan is detected. If the full scan detects new channels, then at optional step 150, the user may automatically be prompted to inform the user that new channels are detected. It is appreciated that the user is prompted the next time the television set is placed in a higher power mode, e.g., turned on. At step 160, the detected channels resulting from both the quick scan and the full scan become available and are automatically presented to the user when the television set is in a full power mode. On the other hand, if the full scan does not find a new channel, then at step 160, the detected channels resulting from the quick scan are automatically provided to the user when the television set is in a full power mode.

It is appreciated that in one optional embodiment, at step 170, the full scan is executed periodically when the television set is in a lower power mode, e.g., turned off, standby, etc. It is appreciated that the time duration between periodic scanning using the full scan may be set during manufacturing and/or it may be user definable. Accordingly, new channels may be automatically detected when new channels are added and broadcast by the service provider.

Figure 2:
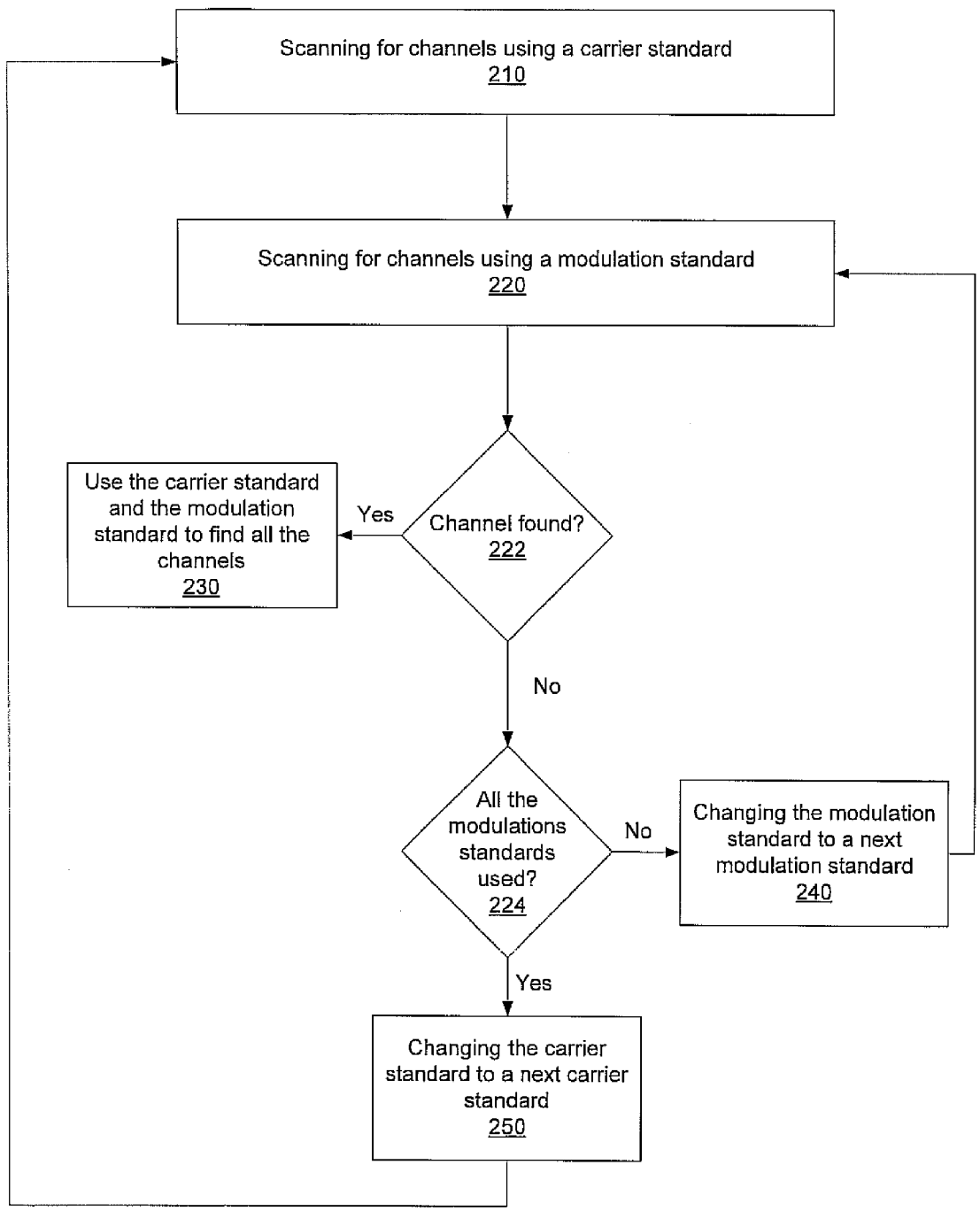
FIG. 2 shows a flow diagram of an exemplary method of fast channel scanning in accordance with one embodiment of the present invention.

Referring now to FIG. 2, an exemplary computer controlled method 200 of quick channel scanning in accordance with one embodiment of the present invention is shown. At step 210, a carrier standard may be used to scan for channels. Carrier standards may include incrementally related carrier (IRC), harmonically related carrier (HRC), standard broadcast frequency (STD), etc.

At step 220, a modulation standard is used to scan for channels. For example, the modulation standard may include 8 vestigial sideband modulation (8VSB), quadrature amplitude modulation 64 (QAM 64), QAM 128, QAM 256, etc.

At step 222, the quick scan automatically determines whether a channel is found. If a channel is found for the carrier standard and the modulation standard, then at step 230, only the same carrier standard and the same modulation standard is used during scanning in order to find the remaining channels. In other words, based on the first channel that is found, the quick scan presumes that all other channels use the same modulation standard and the same carrier standard. Scanning is therefore limited to these standards. Accordingly, the quick scan does not need to go through the remaining carrier standards and modulation standards, thereby reducing the execution time.

On the other hand, if a channel is not found within a given threshold time period, the scanning for channels using that particular carrier standard and modulation standard times out. It is appreciated that reducing the threshold time is a tradeoff between the fast scan setup procedure executing faster and detecting more channels. At step 224, it is determined whether all the modulation standards have been used. If all the modulation standards have not been used, at step 240, the modulation standard is changed. As a result, at step 220, the same carrier standard is used with a new modulation standard to scan and to detect a channel.

At step 224, if it is determined that all the modulation standards have been used, at step 250, the carrier standard is changed to a next carrier standard. As a result, at step 210, a new carrier standard is used to scan and to detect a channel. Accordingly, the process for finding a channel may be repeated until a channel is found.

It is appreciated that other embodiments may repeat the process without using the modulation standard and the carrier standard for the first channel that is found. For example, the exemplary method 200 may be repeated without step 230. As such, a predetermined number of channels, e.g., 10 channels, may be detected. Thereafter, statistical analysis may be performed on the carrier standard and the modulation of each of the detected channels in order to determine the carrier standard and the modulation standard to be used to detect the remainder of the channels. In other words, a statistical analysis of a few channels that have been found may be used to determine the appropriate modulation standard and the appropriate carrier standard to be used to detect the remaining channels. As a result, the statistical analysis leads to detection of maximum number of channels during the quick scan period.

It is appreciated that in one embodiment, the execution time of the fast scan may be further reduced by reducing of the threshold time causing the scanning to timeout when a channel is not found for a given carrier standard and a given modulation standard. As a result, the execution of the quick scan setup procedure may be completed in less time than the full scan setup procedure. It is further appreciated that the execution time for quick scan may be further reduced by reducing or removing channel tuning. Moreover, the execution time for the quick scan setup procedure may be further reduced by eliminating the decoding to determine whether a found channel is scrambled.

Accordingly, the use of the quick scan and the full scan strikes a balance between the number of channels provided and the amount of time it takes to provide those channels to the user. For example, one embodiment may provide a limited number of channels in a very short amount of time while providing a more comprehensive list of channels after the completion of the full scan execution.

Figure 3:
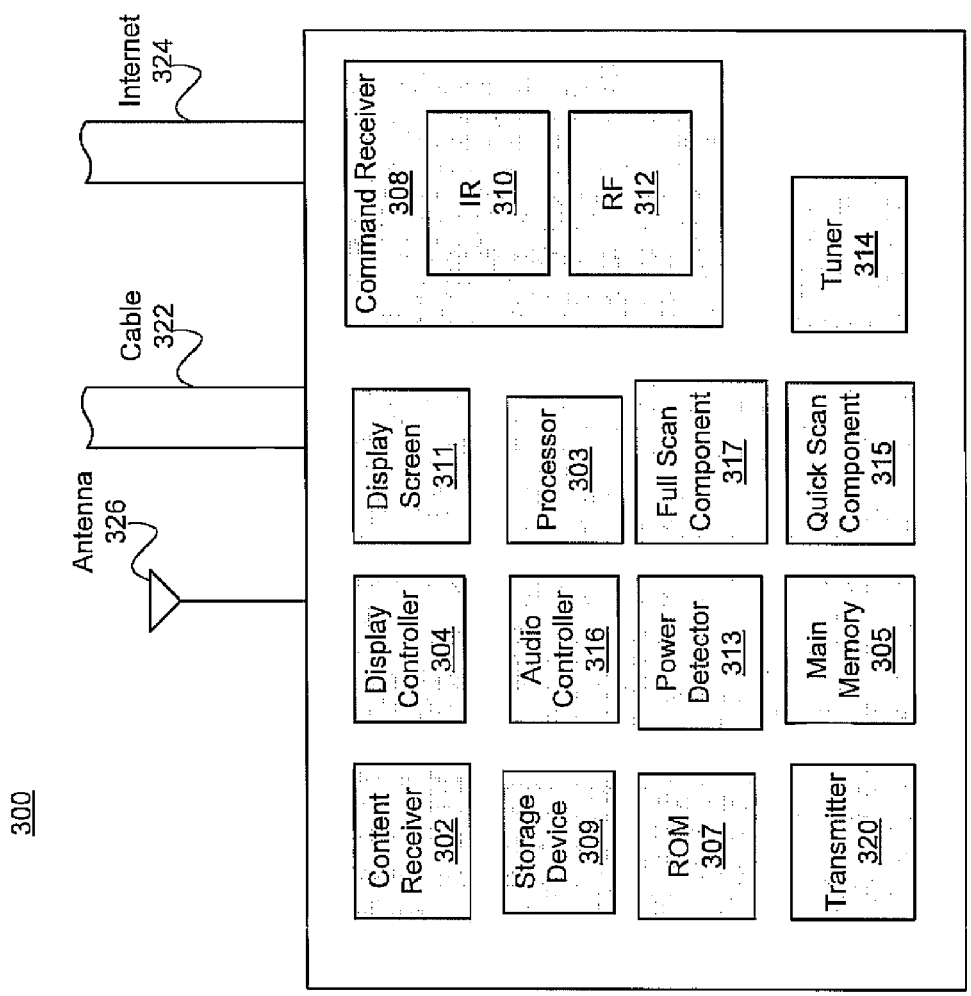
FIG. 3 shows an exemplary television set in accordance with one embodiment of the present invention.

FIG. 3 illustrates components of an exemplary computer controlled television set 300 that may serve as a platform for embodiments of the present invention. Although specific components are disclosed in system 300 it should be appreciated that such components are examples. That is, embodiments of the present invention are well suited to having various other components or variations of the components recited in system 300. The exemplary television set 300 may implement the process for scanning television channels as shown in FIGS. 1-2 includes a processor 303 for processing information and a tuner 314 for tuning the television set 300 to detect channels and signals associated therewith. It is appreciated that the tuner 314 may also convert the detected channel signals into a suitable form that is appropriate for processing by the processor 303.

The exemplary television set 300 also includes a main memory 305, such as a random access memory (RAM) or other dynamic storage device for storing information and instructions to be executed by processor 303. Main memory 305 also may be used for storing temporary variables or other intermediate information during execution of instructions to be executed by processor 303. The exemplary television set 300 further includes a read only memory (ROM) 307 or other static storage device for storing static information and instructions for processor 303. A non-volatile storage device 309, such as a magnetic disk or optical disk, is provided for storing information and instructions and may store the persistent internal queue. According to one embodiment, the instructions for implementing the virtual device may be stored on any one of the memory components (e.g., RAM, ROM, non-volatile storage device and etc.). The exemplary television set 300 may comprise a display screen 311, e.g., cathode ray tube (CRT), for displaying information to a computer user.

The term "computer-readable medium" as used herein refers to any medium that participates in providing instructions to processor 303 for execution. Such a medium may take many forms, including but not limited to, non-volatile media, volatile media, and transmission media. Non-volatile media includes, for example, optical or magnetic disks, such as storage device 309. Volatile media includes dynamic memory, such as main memory 305. Transmission media includes coaxial cables, copper wire and fiber optics, including the wires. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or a television set can read.

The exemplary television set 300 may also include a power detector 313. The power detector 313 may be used to determine whether the television set is in a fully power mode, e.g., on, or at a lower power mode, e.g., standby, off, etc. The television set 300 may further include a quick scan component 315. The quick scan component 315 is operable to scan for channels during first initial setup. The operation of the quick scan component 315 may be similar to that of the quick scan described in FIGS. 1 and 2. The television set 300 may further include a full scan component 317. The full scan component 317 is operable to scan for channels when the television set is in a lower power mode, e.g., standby, off, etc. It is appreciated that the full scan component 317 may scan for channels, thereby detect channels that may have been missed during the quick scan setup. It is appreciated that the full scan component 317 may operate substantially similar to the full scan described in FIG. 1.

The system 300 may further include content receiver 302, display controller 304, command receiver 308, audio controller 316, transmitter 320, cable or satellite connection 322, internet connection 324, and wireless antenna 326.

Content receiver 302 receives content for system 300. Receiver 302 may receive signals including content from a variety of sources including, but not limited to, computers, computer networks, portable devices, set top boxes, over the air broadcasts, cable broadcasts, satellite broadcasts, Digital versatile Discs (DVDs), Blue-ray discs, Digital Video Broadcasting-Handheld (DVB-H), Digital Multimedia Broadcasting (DMB), Digital Video Broadcasting Satellite services to Handhelds (DVB-SH), Digital Audio Broadcasting (DAB), Digital Video Broadcasting IP Datacasting (DVB-IPDC), Internet Protocol Television (IPTV), etc. Content receiver 302 may receive content (e.g., electronic programming guide information and other content) via cable or satellite connection 322, internet connection 324, and wireless antenna 326 (e.g., via 802.11a/b/g/n, Bluetooth, Z wave, Digital Broadcast, etc.).

Display controller 304 controls display screen 311 of system 300. Display controller 304 may control a variety of display screens associated with system 300, including but not limited to, CRTs, LCDs, plasma displays, projection based, and Digital Light Processing (DLP) displays.

Command receiver 308 receives commands. Command receiver 308 may receive commands via a variety of receivers including, but not limited to, infrared receiver and radio frequency receivers. The commands may have been issued via a remote control. In one embodiment, command receiver 308 includes an infrared (IR) receiver 310 and a radio frequency (RF) receiver 312.

The processor 303 processes commands received by system 300 via command receiver 308. The commands received are processed and executed by system 300. For example, control codes (e.g., increase volume, change channel, launch an application, launch web browser, etc.) may be received via an infrared receiver 310 or radio frequency receiver 312, decoded, and sent to the processor 303.

Audio controller 316 controls audio output for system 300 including a variety of outputs including, but not limited to, 2, 2.1, 3.1, 5.1, 6.1, 7.1, and 8.1 channel audio. The audio content may be received via content receiver 302. It is appreciated that audio controller 316 may output to audio equipment integrated within system 300.

Transmitter 320 may send signals to a control device (e.g., remote control). The signals may include, but are not limited to, acknowledgments, EPGs (e.g., for download to a remote control) encrypted information, and information based on on-screen selections.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer readable medium comprising instructions that when executed implement a method for scanning television channels at initial setup, said method comprising:
   at a first mode, automatically scanning for channels using a first scanning setup procedure during which said television is unusable by a user,
   upon completion of said first scanning setup procedure, automatically providing detected channels for use by said television; and
   at a second mode, automatically scanning for channels using a second scanning setup procedure, wherein responsive to a channel being found in a scanning setup procedure for a first carrier standard and a first modulation standard, the first carrier standard and the first modulation standard are subsequently used during the scanning setup procedure to find remaining channels, and responsive to a determination that a channel is not found in the scanning setup procedure within a time period, at least a second carrier standard and/or at least a second modulation standard is subsequently used during the scanning setup procedure.

2. The computer readable medium as described in claim 1, wherein said automatically scanning for channels using said second scanning setup procedure further comprises:
   automatically detecting additional channels not detected during said initial setup by said first scanning setup procedure.

3. The computer readable medium as described in claim 2, wherein said method further comprises:
   in response to said detecting said additional channels, automatically providing said additional channels for use by said television when said television is at said first mode.

4. The computer readable medium as described in claim 2, wherein said method further comprises:
   in response to said detecting said additional channels, automatically prompting said user that said additional channels are detected, wherein said prompting occurs at said first mode.

5. The computer readable medium as described in claim 1, wherein said method further comprises:
   subsequent to said automatically scanning for channels using said second scanning setup procedure, automatically and periodically scanning for channels using said second scanning setup procedure at standby power mode.

6. The computer readable medium as described in claim 1, wherein said second scanning setup procedure has a longer time out parameter for finding a channel in comparison to said first scanning setup procedure.

7. The computer readable medium as described in claim 1, wherein said first scanning setup procedure is limited to using a carrier and a modulation used to find a first detected channel when detecting remaining channels.

* * * * *